US011879351B2

(12) United States Patent
Kim et al.

(10) Patent No.: US 11,879,351 B2
(45) Date of Patent: Jan. 23, 2024

(54) COMPOSITE COMPONENT WITH DAMPER FOR GAS TURBINE ENGINE

(71) Applicant: RAYTHEON TECHNOLOGIES CORPORATION, Farmington, CT (US)

(72) Inventors: Russell Kim, Glastonbury, CT (US); James T. Roach, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 35 days.

(21) Appl. No.: 17/549,168

(22) Filed: Dec. 13, 2021

(65) Prior Publication Data
US 2023/0184136 A1 Jun. 15, 2023

(51) Int. Cl.
*F01D 25/28* (2006.01)
*F01D 25/24* (2006.01)

(52) U.S. Cl.
CPC .......... *F01D 25/28* (2013.01); *F01D 25/24* (2013.01)

(58) Field of Classification Search
CPC . F01D 5/282; F01D 5/284; F01D 5/28; F01D 5/147; B23B 3/266; D03D 25/005; B29D 99/0025
See application file for complete search history.

(56) References Cited

U.S. PATENT DOCUMENTS

| 4,617,072 A * | 10/1986 | Merz ..................... C04B 35/524 428/116 |
| 5,129,787 A | 7/1992 | Violette et al. |
| 5,350,545 A | 9/1994 | Streckert et al. |
| 6,746,755 B2 | 6/2004 | Morrison et al. |
| 7,955,054 B2 * | 6/2011 | El-Aini ..................... F01D 5/16 416/500 |
| 8,257,809 B2 | 9/2012 | Morrison et al. |
| 8,333,565 B2 | 12/2012 | McMillan |

(Continued)

FOREIGN PATENT DOCUMENTS

| EP | 3693549 A1 | 8/2020 |
| WO | 2014176228 A1 | 10/2014 |
| WO | 2017146724 A1 | 8/2017 |

OTHER PUBLICATIONS

Extended European Search Report for Application No. EP 22211733.5 dated Jun. 13, 2023.

*Primary Examiner* — Woody A Lee, Jr.
*Assistant Examiner* — Cameron A Corday
(74) *Attorney, Agent, or Firm* — Carlson, Gaskey & Olds, P.C.

(57) ABSTRACT

An assembly for a gas turbine engine according to an aspect of the present disclosure includes a metallic damper including a first contact surface and a gas turbine engine component. The gas turbine engine component includes a main body extending in a first direction between a gaspath surface and a second contact surface. The first and second contact surfaces oppose each other along an interface extending in a second direction. The first and second contact surfaces are dimensioned to contact each other along the interface in a hot assembly state. The main body is established by a composite including fibers in a matrix material. At least some of the fibers are arranged to establish a plurality of cooling passages aligned with the interface relative to the second direction. A method of damping for a gas turbine engine is also disclosed.

21 Claims, 13 Drawing Sheets

(56) References Cited

U.S. PATENT DOCUMENTS

| | | | | |
|---|---|---|---|---|
| 10,207,471 | B2* | 2/2019 | de Diego | F01D 5/147 |
| 11,339,666 | B2* | 5/2022 | Hart | F01D 5/225 |
| 11,365,636 | B2* | 6/2022 | Ganiger | F01D 5/16 |
| 11,578,609 | B2* | 2/2023 | Clark | C04B 35/62868 |
| 2003/0059577 | A1* | 3/2003 | Morrison | B32B 3/18 |
| | | | | 428/188 |
| 2004/0253115 | A1* | 12/2004 | Williams | F01D 5/16 |
| | | | | 416/229 R |
| 2010/0329847 | A1* | 12/2010 | Yamashita | F01D 9/041 |
| | | | | 415/115 |
| 2012/0125585 | A1* | 5/2012 | Morrison | F01D 5/187 |
| | | | | 165/172 |

* cited by examiner

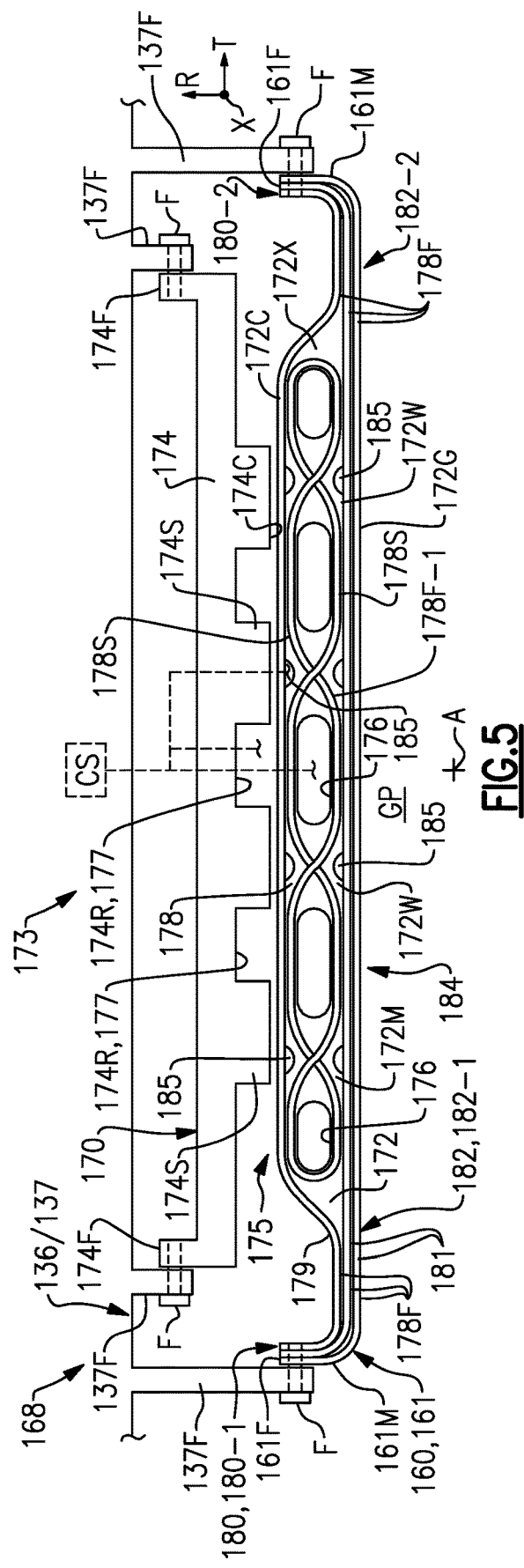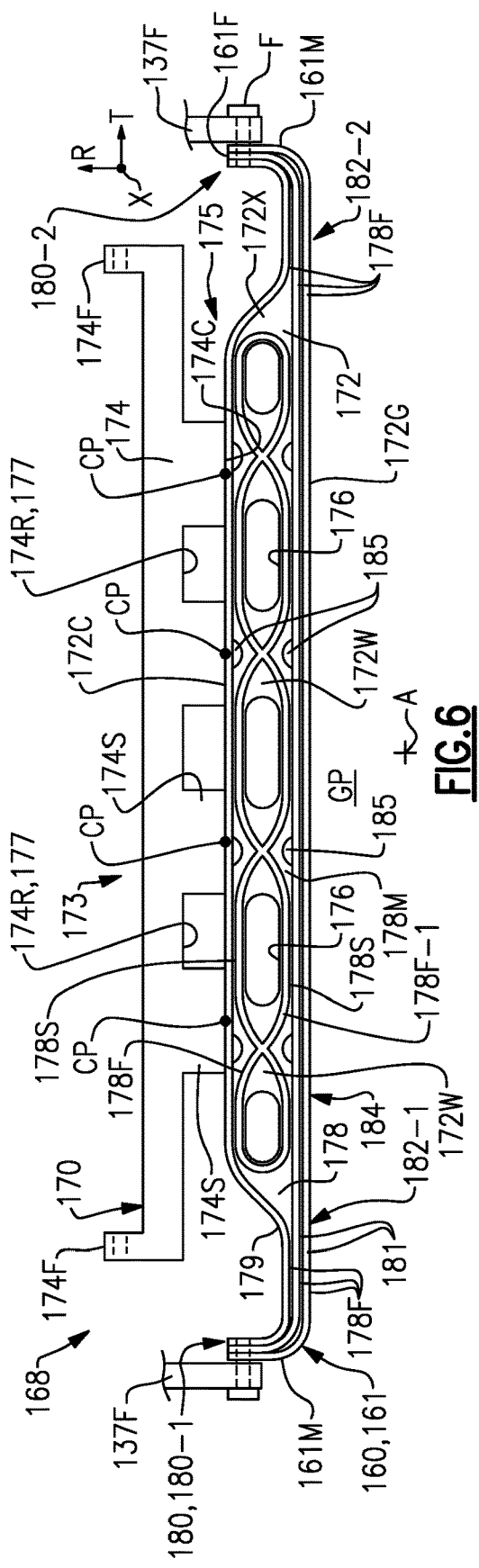

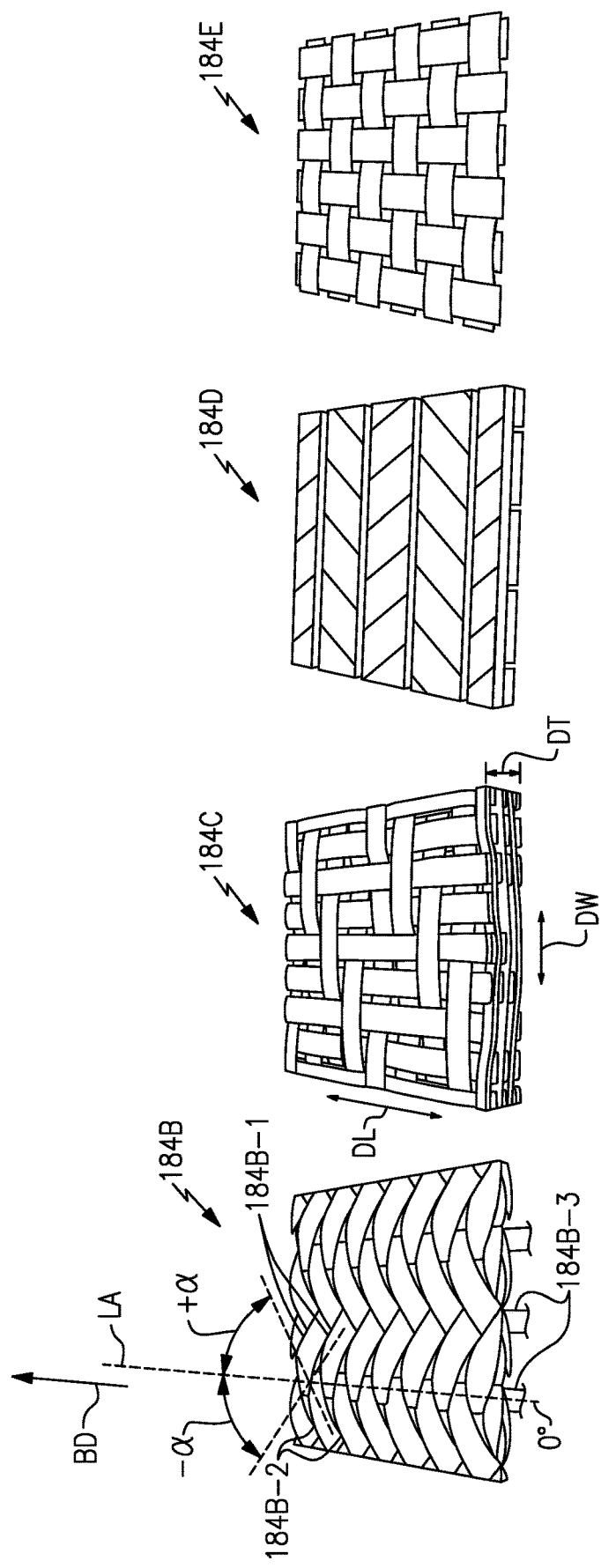

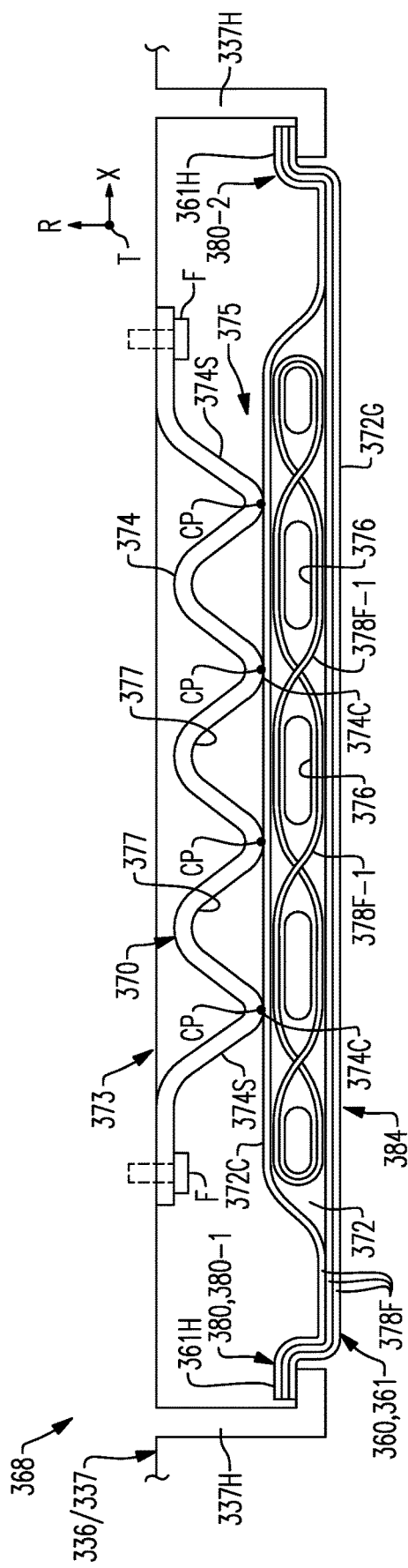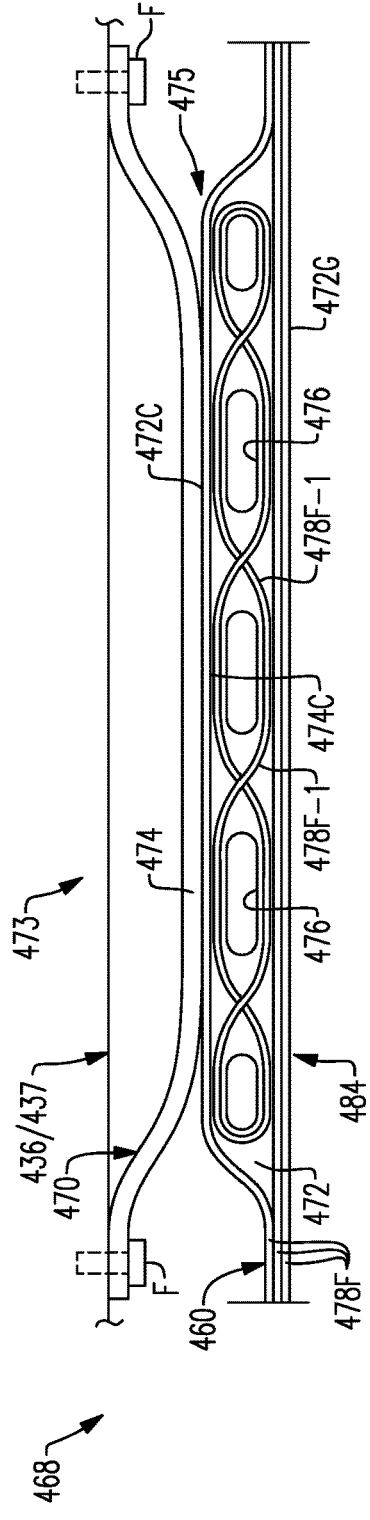

COMPOSITE COMPONENT WITH DAMPER FOR GAS TURBINE ENGINE

BACKGROUND

This disclosure relates to fabrication and damping of composite components of a gas turbine engine.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged in an array. The blades, vanes and arc segments are exposed to relatively hot gases in the gas flow path and may be configured to receive cooling airflow to cool portions of the component. The components may be subject to vibration during engine operation.

SUMMARY

An assembly for a gas turbine engine according to an example of the present disclosure includes a metallic damper including a first contact surface, and a gas turbine engine component including a main body extending in a first direction between a gaspath surface and a second contact surface. The first and second contact surfaces oppose each other along an interface extending in a second direction, and the first and second contact surfaces are dimensioned to contact each other along the interface in a hot assembly state. The main body is established by a composite including fibers in a matrix material, and at least some of the fibers are arranged to establish a plurality of cooling passages aligned with the interface relative to the second direction.

In a further embodiment of any of the foregoing embodiments, the first and second contact surfaces abut each other along the interface in a cold assembly state.

In a further embodiment of any of the foregoing embodiments, the first and second contact surfaces are spaced apart along the interface in a cold assembly state.

In a further embodiment of any of the foregoing embodiments, the damper includes a damper body having a plurality of standoffs dimensioned to establish a set of discrete contact points along the interface in the hot assembly state.

In a further embodiment of any of the foregoing embodiments, the fibers include sets of fibers arranged in two-dimensional weaves about the respective cooling passages.

In a further embodiment of any of the foregoing embodiments, the fibers are arranged to establish an overwrap that encircles the sets of fibers and the cooling passages.

In a further embodiment of any of the foregoing embodiments, the fibers are arranged to establish a three-dimensional weave, and the three-dimensional weave includes segments of fiber that alternate on opposite sides of the cooling passages and crisscross to establish one or more internal walls of the main body between the cooling passages.

In a further embodiment of any of the foregoing embodiments, the main body includes a core established by the fibers. The core includes the cooling passages. The main body includes a first mounting point and a second mounting point on opposite sides of the core relative to the second direction. The main body includes a first ply and a second ply extending along opposite sides of the core relative to the first direction to establish the gas path surface and the second contact surface, and the first and second plies are joined together at a first bifurcation and a second bifurcation adjacent to the respective first and second mounting points.

In a further embodiment of any of the foregoing embodiments, the gas turbine engine component is dimensioned to be suspended between the first and second mounting points in an installed position.

In a further embodiment of any of the foregoing embodiments, the damper includes a damper body having a plurality of standoffs, and the plurality of standoffs are dimensioned to establish a set of discrete contact points along the interface in the hot assembly state. The gas turbine engine component and the damper cooperate to establish a plurality of cooling paths along the interface between the set of discrete contact points.

In a further embodiment of any of the foregoing embodiments, the gas turbine engine component is a turbine component.

A gas turbine engine according to an example of the present disclosure includes an array of blades rotatable about an engine axis, an array of vanes adjacent to the array of blades, and an array of blade outer air seals distributed about the array of blades to bound a gas path. At least one of the blades, the vanes and the blade outer air seals includes a metallic damper including a first contact surface, a wall including a main body extending between a gaspath surface and a second contact surface, and the first and second contact surfaces dimensioned to contact each other along an interface during engine operation. The main body is established by a composite including fibers in a matrix material, and at least some of the fibers are arranged to establish a plurality of cooling passages adjacent to the interface.

In a further embodiment of any of the foregoing embodiments, the wall is suspended between first and second mounting points secured to an engine static structure, and the first and second mounting points are spaced apart from and on opposite sides of the interface.

In a further embodiment of any of the foregoing embodiments, the wall extends in an axial direction between a leading edge portion and a trailing edge portion, extends in a circumferential direction between first and second mate faces and extends in a radial direction between the second contact surface and the gas path surface relative to the engine axis. One of the first and second contact surfaces faces radially outwardly with respect to the radial direction, and another one of the first and second contact surfaces faces radially outwardly with respect to the radial direction.

In a further embodiment of any of the foregoing embodiments, the fibers are arranged to establish a three-dimensional weave, and the three-dimensional weave includes segments of fiber arranged along respective periodic paths that alternate on opposite sides of the cooling passages and crisscross to establish one or more internal walls of the main body between the cooling passages.

In a further embodiment of any of the foregoing embodiments, the damper includes a damper body having a plurality of standoffs dimensioned to establish a set of discrete contact points along the interface during engine operation. The gas turbine engine component and the damper cooperate to establish a plurality of cooling paths along the interface between the set of discrete contact points.

A method of damping for a gas turbine engine according to an example of the present disclosure includes positioning a gas turbine engine component adjacent to a metallic damper. The damper includes a first contact surface. The gas turbine engine component includes a main body extending between a gaspath surface and a second contact surface, and the main body is established by a composite including fibers arranged to establish a plurality of cooling passages aligned with an interface. The method includes damping the gas turbine engine component in response to contact between the first and second contact surfaces along the interface, and conveying cooling flow through the cooling passages to provide cooling augmentation to a portion of the damper in contact with the gas turbine engine component along the interface.

A further embodiment of any of the foregoing embodiments includes securing the gas turbine engine component to a static structure at first and second mounting points. The first and second mounting points are spaced apart from and on opposite sides of the interface such that the gas turbine engine component is suspended between the first and second mounting points.

In a further embodiment of any of the foregoing embodiments, the fibers are arranged to establish a three-dimensional weave, and the three-dimensional weave includes segments of fiber that alternate on opposite sides of the cooling passages and crisscross to establish one or more internal walls of the main body between the cooling passages.

A further embodiment of any of the foregoing embodiments includes conveying cooling flow through a plurality of cooling paths established between a set of discrete contact points along the interface.

The present disclosure may include any one or more of the individual features disclosed above and/or below alone or in any combination thereof.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 5 is a sectional view taken through line 5-5 of the assembly of FIG. 4 with the component and damper in a first position.

FIG. 6 is a sectional view taken through line 6-6 of the assembly of FIG. 4 with the component and damper in a second position.

FIG. 7B illustrates triaxially braided yarns.
FIG. 7C illustrates a three-dimensional woven fabric.
FIG. 7D illustrates a non-crimp fabric.
FIG. 7E illustrates a two-dimensional fabric.

FIG. 10 illustrates a sectional view of another assembly including a damper.

FIG. 11 illustrates a sectional view of yet another assembly including a damper.

DETAILED DESCRIPTION

Figure 1:
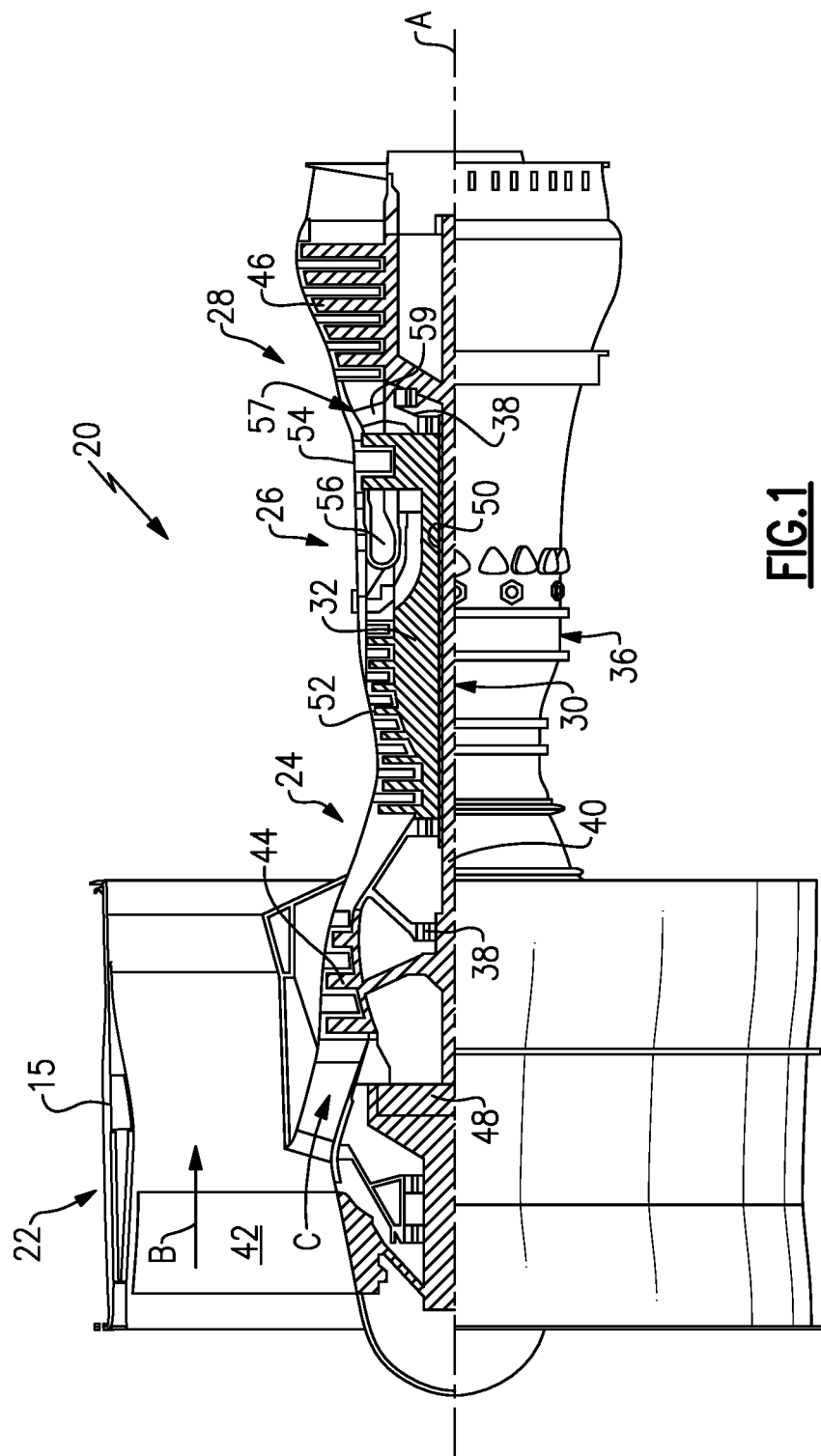
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
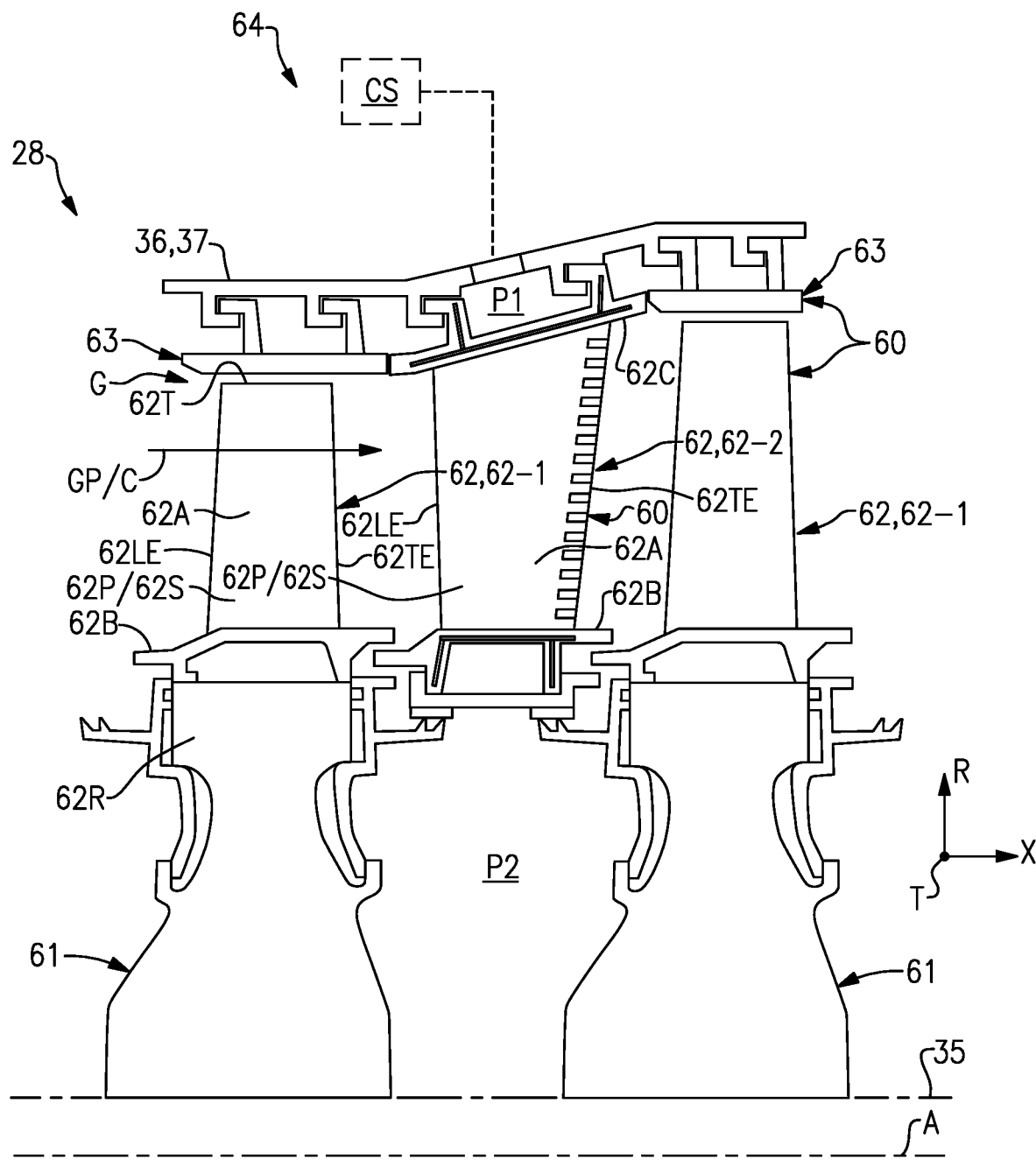
FIG. 2 shows an airfoil arrangement for a turbine section.

FIG. 2 illustrates an exemplary section of a gas turbine engine, such as the turbine section 28 of FIG. 1. The turbine section 28 includes a plurality of components 60 arranged relative to the engine axis A, including a rotor 61, one or more airfoils 62, and one or more blade outer air seals (BOAS) 63. Example airfoils 62 include rotatable blades 62-1 and static vanes 62-2. The rotor 61 is coupled to a rotatable shaft 35 (shown in dashed lines for illustrative purposes). The shaft 35 can be one of the shafts 40, 50 of FIG. 1, for example. The rotor 61 carries one or more blades 62-1 that are rotatable about the engine axis A in a gas path GP, such as the core flow path C.

Each airfoil 62 includes an airfoil section 62A extending in a spanwise or radial direction R from a first (e.g., inner) platform section 62B. Each blade 62-1 extends in the radial direction R from the platform section 62B to a tip portion 62T. Each vane 62-2 extends in the radial direction R from the first platform section 62B to a second (e.g., outer) platform section 62C. The platform sections 62B, 62C can serve as end walls that bound or define a respective portion of the gas path GP. The airfoil section 62A generally extends in a chordwise or axial direction X between a leading edge 62LE and a trailing edge 62TE, and extends in a circumferential or thickness direction T between pressure and suction sides 62P, 62S. The pressure and suction sides 62P, 62S are joined at the leading and trailing edges 62LE, 62TE to establish an aerodynamic surface contour of the airfoil 62. The root section 62R of the blade 62-1 can be mounted to, or can be integrally formed with, the rotor 61. The vane 62-2 can be arranged to direct or guide flow in the gas path GP from and/or towards the adjacent blade(s) 62-1.

Each BOAS 63 can be spaced radially outward from the tip portion 62T of the blade 62-1. The BOAS 63 can be continuous or can be segmented to include an array of seal arc segments that are circumferentially distributed or arranged in an annulus about the engine axis A and about an array of the blades 62-1 to bound the gas path GP, as illustrated in FIG. 3.

The turbine section 28 can include at least one array of airfoils 62, including at least one array of blades 62-1 and at least one array of vanes 62-2, and can include at least one array of BOAS 63 arranged circumferentially about the engine axis A. The array of vanes 62-2 are adjacent to and spaced axially from the array of blades 62-1 relative to the engine axis A. The tip portions 62T of the blades 62-1 and adjacent BOAS 63 are arranged in close radial proximity to reduce the amount of gas flow that escapes around the tip portions 62T through a corresponding clearance gap G. The engine 20 can include an active or passive clearance control system to adjust the clearance gap G to a desired dimension during one or more operating conditions of the engine 20. The clearance gap G may also vary during operation of the engine 20, such as between a non-operating, cold assembly state or condition, a cruise condition and/or a takeoff condition.

The turbine section 28 includes a cooling arrangement 64 for providing cooling augmentation to the components 60 during engine operation. The cooling arrangement 64 can include one or more cooling cavities or plenums P1, P2 defined by a portion of the engine static structure 36 such as the engine case 37. The plenum P2 can be at least partially defined or bounded by a rotatable portion of the engine 20, such as the rotor 61. One or more coolant sources CS (one shown) are configured to provide cooling air to the plenums P1, P2. The plenums P1, P2 are configured to receive pressurized cooling flow from the coolant source(s) CS to cool portions of the components 60 including the airfoils 62 and/or BOAS 63. Coolant sources CS can include bleed air from an upstream stage of the compressor section 24 (FIG. 1), bypass air, or a secondary cooling system aboard the aircraft, for example. Each of the plenums P1, P2 can extend in the circumferential direction T between adjacent airfoils 62 and/or BOAS 63.

Figure 3:
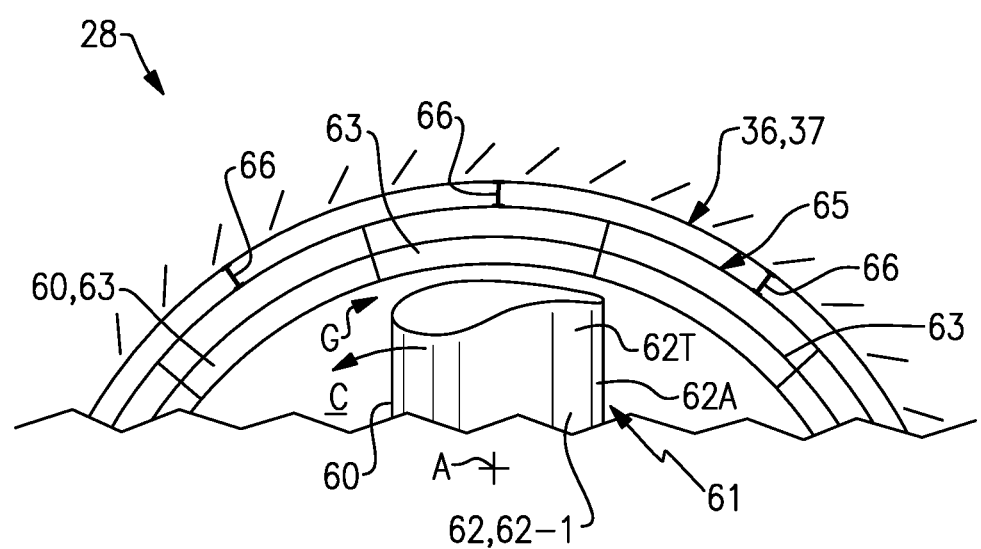
FIG. 3 illustrates an axial view of the airfoil arrangement of FIG. 2.

FIG. 3 illustrates an axial view of an assembly, such as a portion of one of the stages of the turbine section 28. The BOAS 63 can be mounted or otherwise secured to a support 65. The support 65 can be continuous or segmented. The support 65 can be mounted through one or more connections 66 to the engine case 37 or another portion of the engine static structure 36. In other examples, the BOAS 63 are directly attached to the engine case 37.

Each component 60 can be formed of a material having a high temperature capability, including metallic and non-metallic materials. Example metallic materials include metals and alloys, such as nickel-based and single crystal alloys. Example non-metallic materials include ceramic-based materials such as monolithic ceramics and ceramic matrix composites (CMC). Monolithic ceramics can include silicon carbide (SiC) and silicon nitride ($Si_3N_4$) materials. Other non-metallic materials include polymer matrix composites (PMC). Example PMC materials can include fibers embedded in a polymer matrix. Exemplary fibers can include ceramic, carbon, steel, aramid fibers. The polymer matrix may incorporate thermoset and thermoplastic materials, for example.

Components 60 constructed from CMC and/or other composite materials may be suspended between and mounted to the engine static structure 36 at opposed ends of the respective component 60. The composite component 60 may be subject to mechanical and thermal stress concentrations during engine operation, including vibration, which may lead to degradation of the component 60. Additionally, metal to CMC interface temperatures may exceed maximum use temperatures of the component 60. The composite components 60 can incorporate one or more cooling flow paths to provide cooling augmentation. These cooling flow paths may be subject to blockage due to degradation of the component 60.

The teachings disclosed herein can be utilized to dampen and provide cooling augmentation to various gas turbine engine components and assemblies during engine operation, including components incorporating any of the materials disclosed herein. The disclosed teachings can be utilized to improve durability of the component and any associated damper. The teachings disclosed herein can be utilized to reduce a likelihood of blockage of cooling flow paths through the component.

Figure 4:
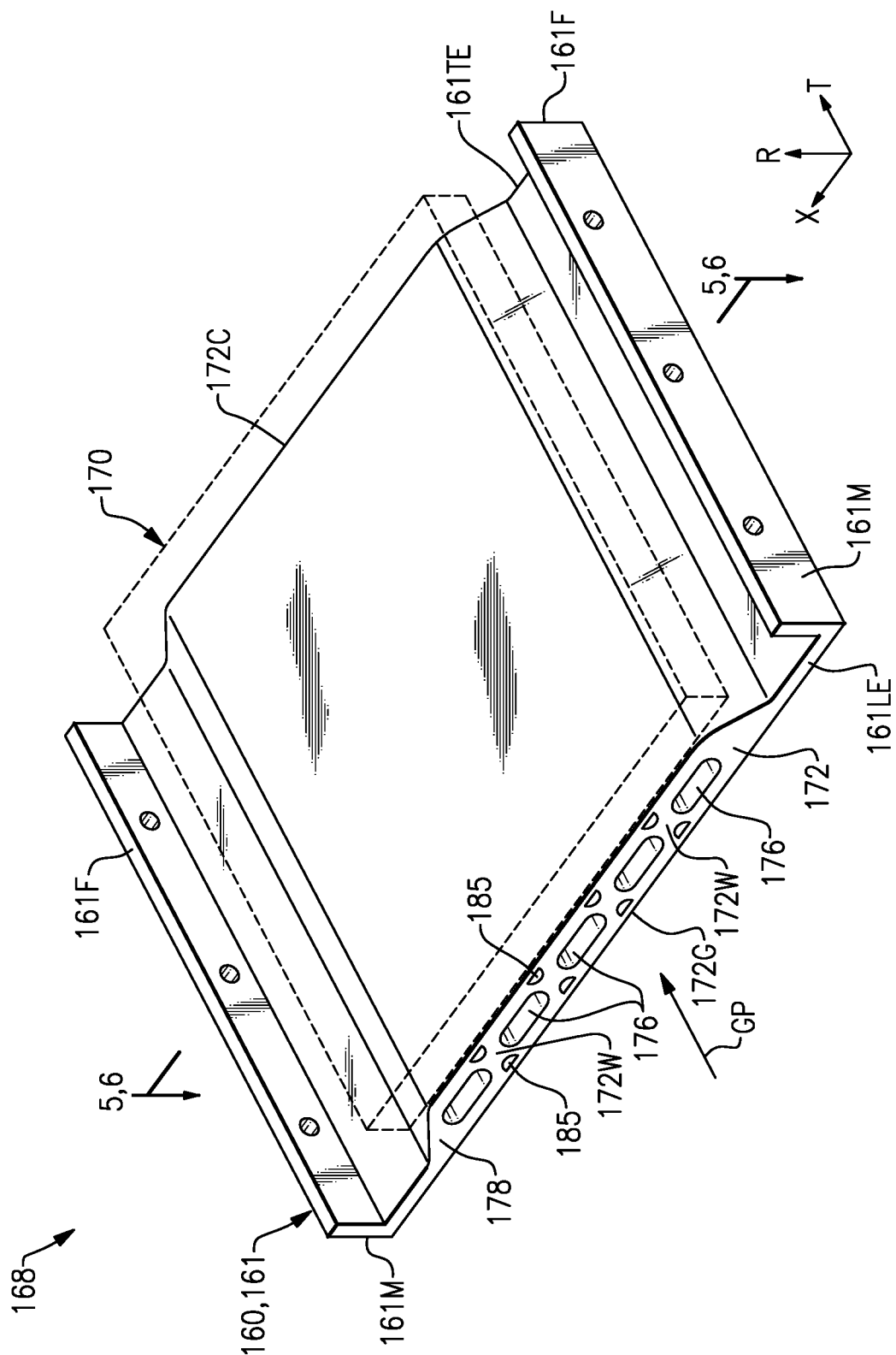
FIG. 4 illustrates a perspective view of an exemplary assembly including a gas turbine engine component adjacent to a damper.

FIGS. 4-6 disclose an exemplary assembly 168 for a gas turbine engine. In this disclosure, like reference numerals designate like elements where appropriate and reference numerals with the addition of one-hundred or multiples thereof designate modified elements that are understood to incorporate the same features and benefits of the corresponding original elements. The assembly 168 can be incorporated into the turbine section 28 or another portion of the engine 20. Other portions of the engine 20 can benefit from the teachings disclosed herein, including airfoils and end walls in the compressor section 24, combustor panels or liners defining portions of a combustion chamber in the combustor section 26, exhaust nozzles, and other portions of the engine 20 that may be subject to vibration and/or elevated temperature conditions during engine operation. Other systems can also benefit from the teachings disclosed herein, including engines lacking a fan for propulsion.

Referring to FIG. 4, the assembly 168 can include at least one gas turbine engine component 160 and damper 170 (shown in dashed lines for illustrative purposes). The component 160 can establish a wall 161 of a gas turbine engine, such as engine 20. The wall 161 can be dimensioned to bound a gas path GP, such as the core flow path C of FIG. 1. The wall 161 can be incorporated into various portions of the engine, such as components of the compressor section 24, combustor section 26, and/or turbine section 28. The component 160 can be a turbine component or portion thereof, such as one of the airfoils 62 or the BOAS 63 of FIG. 2. The wall 161 can be incorporated in the airfoil section 62A and/or platform sections 62B, 62C of the airfoils 62 of FIG. 2. The assembly 168 can be established by at least one of the blades 62-1, vanes 62-2, and/or BOAS 63 of the turbine section 28 to provide damping and cooling augmentation.

The component 160 includes a main body 172 extending in a first direction between a gas path surface 172G and a component (e.g., second) contact surface 172C. The first direction may be substantially parallel to a radial direction R such that the main body 172 extends in the radial direction R between the contact surface 172C and gas path surface 172G relative to the engine axis A. The gas path surface 172G is dimensioned to bound a portion of the gas path GP. In implementations, the main body 172 extends in an axial direction X between a leading edge portion 161LE and a trailing edge portion 161TE. The main body 172 can extend in a circumferential direction T between first and second mate faces 161M. It should be understood that arrangement of the component 160 of FIGS. 4-6 is exemplary and that the component 160 can be arranged at any orientation relative to the engine axis A in accordance with the teachings disclosed herein.

Referring to FIG. 5, with continuing reference to FIG. 4, the component 160 can include flanges 161F extending outwardly from the main body 172. Each of the flanges 161F can extend along a respective one of the mate faces 161M and can extend substantially or completely between the leading and trailing edge portions 161LE, 161TE (see, e.g., FIG. 4). The term "substantially" means within 90% of the stated value or relationship unless otherwise indicated. The flanges 161F can be mounted to flanges 137F of the engine case 137 or another portion of the engine static structure 136 utilizing various techniques, such as one or more fasteners F. The flanges 161F can be secured to the engine static structure 136 at respective first and second mounting points 180 (indicated at 180-1, 180-2). The component 160 can be dimensioned to extend between the mounting points 180-1, 180-2 in an installed position. The component 160 can be suspended between the mounting points 180-1, 180-2. In other implementations, the component 160 can additionally and/or alternatively be mounted to the engine static structure 136 at one or more positions along the main body 172 inward of the leading and trailing edges 161LE, 161TE and/or mate faces 161M.

The damper 170 can be dimensioned and situated in the assembly 168 to provide damping of vibration experienced by adjacent component(s) 160 during engine operation, which can improve durability of the component(s) 160. The damper 170 can include a damper body 174 including a damper (e.g., first) contact surface 174C. The damper 170 can include flanges 174F extending outwardly from the damper body 174. The flanges 174F can be mounted to flanges 137F of the engine case 137 or another portion of the engine static structure 136 utilizing various techniques, such as one or more fasteners F. The damper 170 can be suspended between the flanges 174F.

The component contact surface 172C and damper contact surface 174C can be arranged to face or oppose each other along an interface 175 in a cold assembled state, as illustrated in FIG. 5. The interface 175 can extend in a second direction, which can be substantially parallel to the axial and/or circumferential directions X, T. The contact surfaces 172C, 174C can be dimensioned, and the component 160 and damper 170 can be arranged, such that the contact surfaces 172C, 174C are spaced apart from each other but are in close proximity to establish a gap along the interface 175 in a cold assembly state, as illustrated in FIG. 5. The gap can be dimensioned based on expected temperature excursions and thermal growth of the component 160 and damper 170 during operation. In other implementations, the contact surfaces 172C, 174C are dimensioned, and the component 160 and damper 170 are arranged, such that the contact surfaces 172C, 174C abut or contact each other along the interface 175 in the cold assembly state, as illustrated in FIG. 6. The mounting points 180-1, 180-2 can be spaced apart from, and can be on opposite sides of, the interface 175. The gap can be dimensioned such that a pressure between contact surfaces 172C, 174C during the cold assembly state can be less than or equal to 10%, or more narrowly less than or equal to 5%, of a maximum pressure between the contact surfaces 172C, 174C during the hot assembly state. The maximum pressure can be associated with a takeoff condition or maximum power of the engine.

The component 160 and damper 170 can be arranged to establish contact or abutment with one another other along the interface 175 in a hot assembly state, as illustrated in FIG. 6. The damper 170 is dimensioned to provide load transfer, damping of vibration of the component 160 and absorption of energy in response to contact along the interface 175 during engine operation. The contact surfaces 172C, 174C can abut or contact each other along the interface 175 in the hot assembly state, including during engine operation.

The component 160 and damper 170 can be arranged such that one of the component and damper (e.g., first and second) contact surfaces 172C, 174C faces radially inward with respect to the radial direction R, and such that another one of the component and damper contact surfaces 172C, 174C faces radially outward with respect to the radial direction R. In the example of FIGS. 5 and 6, the damper contact surface 174C faces radially inward with respect to the radial direction R, and the component contact surface 172C faces radially outward with respect to the radial direction R. However, it should be understood that the opposite arrangement of the contact surfaces 172C, 174C can be utilized in accordance with the teachings disclosed herein.

The component 160 and damper 170 can be exposed to hot gases conveyed through the gas path GP and elevated temperatures during engine operation. The assembly 168 can incorporate a cooling scheme 173 for providing cooling augmentation to portions of the assembly 168 during engine operation, including the component 160 and/or damper 170. The cooling augmentation can reduce thermal stress concentrations and degradation of the component 160 and damper 170.

The cooling scheme 173 can be established by one or more cooling passages 176 and/or cooling paths 177, 185. Each of the cooling passages 176 and cooling paths 177, 185 can be dimensioned to convey cooling flow from a cooling source CS to cool portions of the component 160 and/or damper 170 adjacent to the interface 175 (cooling source CS shown in dashed lines in FIG. 5 for illustrative purposes). A cross-sectional area of the cooling passages 176 and cooling paths 177, 185 can be the same or can differ. In implementations, cooling passages 176 adjacent a perimeter of the interface 175 can have a smaller cross-sectional area than cooling passages 176 relatively more inward of the perimeter of the interface 175 and towards the center of the component 160. The cooling passages 176 and cooling paths 177, 185 can be substantially linear or can have a curved or complex profile to provide targeted cooling augmentation. The respective profiles of the cooling passages 176 and cooling paths 177, 185 can be established to direct cooling flow to localized regions of the component 160 that may have relatively greater cooling demands and/or to avoid localized regions of the component 160 having relatively greater stiffness demands relative to vibration damping requirements. The cooling passages 176 and cooling paths 177, 185 can be fluidly isolated from the other cooling passages 176 and cooling paths 177, 185 and/or from each other along a span of the component 160. In operation, the component 160 may have a relatively higher temperature than the damper 170 such that contact between the component 160 and damper 170 may cause an increase in temperature of the damper 170, or vice versa. The damper 170 may also be exposed to relatively hot gases communicated in the adjacent gas path. The cooling scheme 173 can be utilized to reduce a temperature of the component 160 and damper 170 including during contact, which may reduce a likelihood of the component 160 and/or damper 170 operating above a maximum design temperature of the material. The cooling augmentation can reduce a temperature of the damper 170, which can increase damping capability of the damper 170.

The cooling passages 176 can be established in a thickness of the main body 172 of the component 160. The cooling passages 176 can be aligned with the interface 175 relative to the second direction, such as the axial and/or circumferential directions X, T, as illustrated in FIGS. 5 and 6.

The damper body 174 can have one or more standoffs 174S. The damper body 174 can include one or more recesses 174R between adjacent standoffs 174S. Various techniques can be utilized to form the recesses 174R, including a machining or casting operation performed on a block of material. The standoffs 174S can be dimensioned to establish a discrete set of contact points CP along the interface 175 in the hot assembly state, as illustrated in FIG. 6. The standoffs 174S can be dimensioned to have the same heights such that all of the standoffs 174S are in contact with the component contact surface 172C at the same time. In other implementations, the standoffs 174R can have different heights such that fewer than all of the standoffs 174S are in contact with the component contact surface 172C at the same time.

The component 160 and damper 170 can cooperate to establish one or more cooling paths 177 along the interface 175 between the set of discrete contact points CP, as illustrated in FIG. 6. The recesses 174R may be formed as channels in the damper body 174 to establish respective cooling paths 177. The recesses 174R may be formed by removing material from the damper body 174, which can reduce weight of the assembly 168. In implementations, one or more of the cooling paths 177 can be formed in the main body 172 of the component 160 along the component contact surface 172C. The cooling paths 177 can be fluidly isolated from each other along the damper 170 and interface 175. The cooling paths 177 can be generally parallel, perpendicular or otherwise transverse to the cooling passages 176 to provide localized cooling augmentation. In other implementations, the recesses 174R and cooling paths 177 are omitted (see, e.g., FIG. 11).

The cooling passages 176 and cooling paths 177, 185 can be established at various positions relative to each other and the interface 175. The cooling passages 176 can be substantially aligned with respective cooling paths 177, and the standoffs 174S can be substantially aligned with the cooling paths 185, as illustrated in FIGS. 5-6. In examples, one or more cooling passages 176 can be substantially aligned with respective standoffs 174S, as illustrated by the standoff 274S-1 and cooling passage 276-1 of FIG. 11.

Various materials can be utilized to establish or form the component 160 and damper 170. The component 160 and damper 170 can be formed from the same type or different type of materials, including any of the materials disclosed herein such as metallic and/or non-metallic materials. In examples, the component 160 is made of a non-metallic material, and the damper 170 is made of a metallic material. The damper body 174 can have a monolithic construction and can be machined or otherwise formed according to a predetermined geometry (see, e.g., FIGS. 5-6). In implementations, the damper body 174 is formed from sheet metal and shaped according to a predetermined geometry (see, e.g., FIGS. 9-10). In other implementations, the damper 170 is constructed of two or more pieces that are fastened or otherwise secured together.

The component 160 including the main body 172 can be established by a composite construct 178. The composite construct 178 can incorporate any of the materials disclosed herein and can be established by any of the techniques disclosed herein. Example composite materials establishing the composite construct 178 can include ceramic matrix composites (CMC), metal matrix composite (MMC), and organic matrix composites (OMC) including polymeric matrix composites (PMC) and carbon matrix composites (which may be referred to as carbon-carbon composites). The composite construct 178 can include fibers 178F in a matrix material 178M. The fibers 178F can be arranged according to one or more fiber constructions 184. Various techniques can be utilized to establish the composite construct 178, including arranging the fibers 178F in a preform, impregnating the fibers 178F with the matrix material 178M, and then curing the composite construct 178. The fibers 178F can be arranged in tows formed around one or more mandrels corresponding to a geometry of the respective cooling passages 176 and/or cooling paths 185. In examples, cavities associated with the cooling paths 185 can receive filler material such that the cooling paths 185 are omitted. Various techniques can be utilized to establish the matrix, including a chemical vapor infiltration (CVI), melt infiltration (MI) or polymer infiltration and pyrolysis (PIP) process.

Figure 7A:
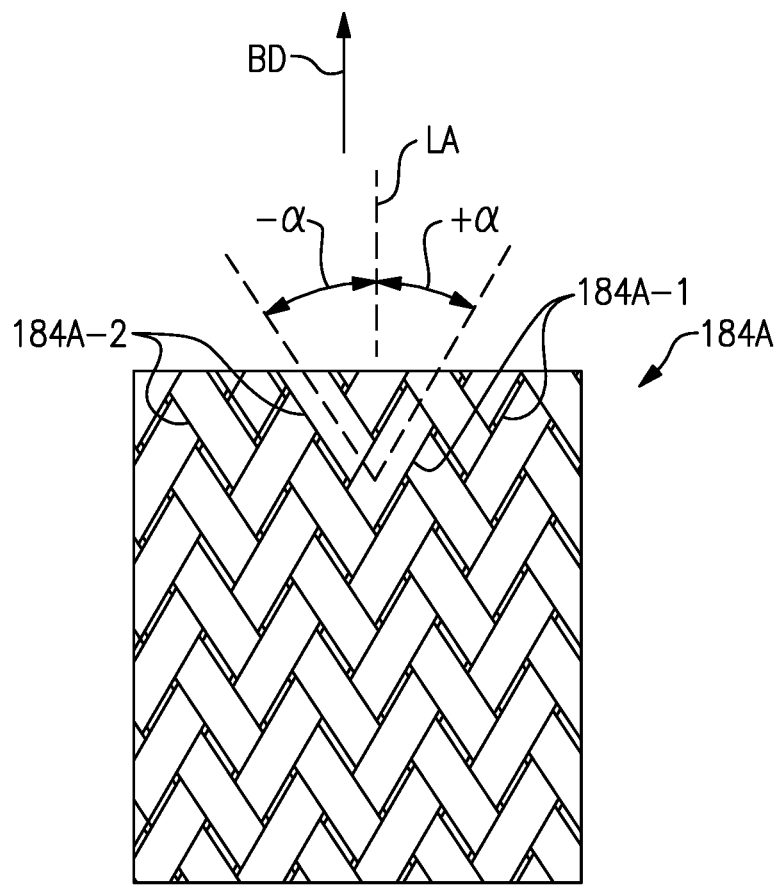
FIG. 7A illustrates biaxially braided yarns.
Figure 7F:
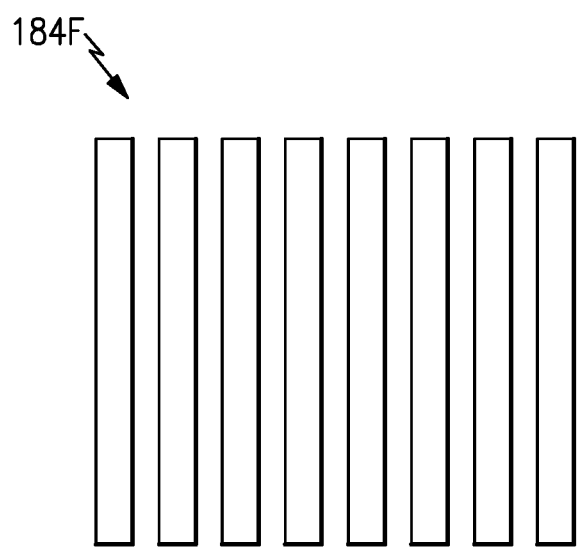
FIG. 7F illustrates a unidirectional pattern.

Various fiber constructions 184 can be utilized to establish the composite construct 178, including fibers arranged in one-dimensional, two-dimensional and/or three-dimensional fiber networks. FIGS. 7A-7K illustrate exemplary fiber constructions 184 (indicated at 184A-184K). In examples, the composite construct 178 is constructed from braided plies including a plurality of braided yarns forming a weave, such as a plurality of biaxially braids 184A (FIG. 7A) and/or triaxially braids 184B (FIG. 7B). The layup of the composite construct 178 can include alternating layers of biaxially braided and triaxially braided plies. Referring to FIG. 7A, the biaxially braid 184A includes a first set of bias tows 184A-1 interlaced with a second set of bias tows 184A-2. The bias tows 184A-1, 184A-2 are arranged to establish respective positive and negative bias angles α with respect to a longitudinal axis LA generally extending in a braid direction BD. Referring to FIG. 7B, the triaxially braid 184B includes first and second sets of bias tows 184B-1, 184B-2 and a set of axial tows 184B-3 interlaced with the bias tows 184B-1, 184B-2. Each axial tow 184B-3 is arranged along a longitudinal axis LA generally extending in a braid direction BD. The bias tows 184B-1, 184B-2 are arranged to establish respective positive and negative bias angles α with respect to the longitudinal axis LA. Example fabrics include a three-dimensional woven fabric 184C having one or more fibers extending in a through-thickness direction DT across multiple planes associated with other fibers extending a width direction DW and/or lengthwise direction DL of the fiber construction 184 (FIG. 7C). Other example fabrics include a non-crimp fabric 184D (FIG. 7D), a two-dimensional woven fabric 184E (FIG. 7E), and satin weaves. Other example fiber constructions include layer-to-layer angle interlock weaves and fibers arranged in a one-dimensional unidirectional pattern 184F (FIG. 7F). There may also be variations within each fiber construction, such as the relative angles of the fibers and tows relative to one another.

Referring back to FIGS. 5 and 6, the main body 172 can include a core 172X. The mounting points 180-1, 180-2 can be established on opposite side of the core 172X relative to the second direction (e.g., the thickness direction T). One or more of the cooling passages 176 can be established in the core 172X. Some of the fibers 178F can be arranged to establish cooling passages 176 adjacent to the interface 175.

The core 172X can be established according to any of the fiber constructions disclosed herein, including fibers 178F arranged to establish a three-dimensional weave. For the purposes of this disclosure, three-dimensional fiber constructions include some amount of fibers woven in a through-thickness direction across multiple planes of the fiber construct (see, e.g., FIG. 7C). The three-dimensional weave may include fibers 178F extending in a through-thickness direction of the core 172X, as illustrated by fiber 178F-1. The fiber 178F-1 can be arranged in a loop that lies in a plane extending in the through-thickness direction of the composite construct 178 (e.g., along the cross section), with the fiber 178F-1 looping about one or more of the cooling passages 176. Segments 178S of the respective fiber 178F can be arranged along generally periodic (e.g., sinusoidal) paths that can alternate on opposite sides of the cooling passages 176 (e.g., over and under). The periodic paths of the segments 178S can crisscross each other to establish one or more internal walls (e.g., partitions) 172W of the main body 172 between adjacent cooling passages 176. At least some of the fibers 178F having an alternating, crisscrossing arrangement can establish one or more of the cooling passages 176. Although a single fiber 178F-1 is illustrated as having segments 178S alternating and crisscrossing to establish the internal walls 172W, it should be understood that the fiber construction 184 can be established a plurality of fibers 178F-1 in the through-thickness direction having an alternating, crisscrossing arrangement to establish the three-dimensional weave. Fibers extending in the lengthwise direction are omitted from the fiber construction 184 of FIGS. 5-6 for illustrative purposes. Each of the internal walls 172W establish a load path between the component contact surface 172C and the gas path surface 172G. The internal walls 172W and alternating, crisscrossing arrangement of fiber(s) 184F-1 in the through-thickness direction can increase rigidity of the component 160, which can reduce a likelihood of blockage through the cooling passages 176 that may otherwise be caused by a collapse of the material.

The composite construct 178 can include other fiber arrangements establishing various portions of the component 160. The main body 172 can include fibers 178F arranged in a first set of plies 179 and a second set of plies 181 extending along opposite sides of the core 172X relative to the first direction (e.g., the radial direction R) to establish the gas path surface 172G and the component contact surface 172C. Each of the sets of plies 179, 181 can include one or more plies arranged in sets to establish layers of the composite construct 178. The plies 179, 181 can be formed according to any of the fiber constructions disclosed herein, two-dimensional and/or three-dimensional fiber constructions. One or more cooling paths 185 can be established at a respective region between the crisscrossing segments 178S of fibers 178F-1 and the adjacent plies 179, 181. The plies 179, 181 can be joined together at one or more bifurcations 182, such as a first bifurcation 182-1 and second bifurcation 182-2. The bifurcations 182-1, 182-2 can be established adjacent to the respective mounting points 180-1, 180-2. The bifurcations 182 can increase an overall inertia of the component 160.

Figure 8:
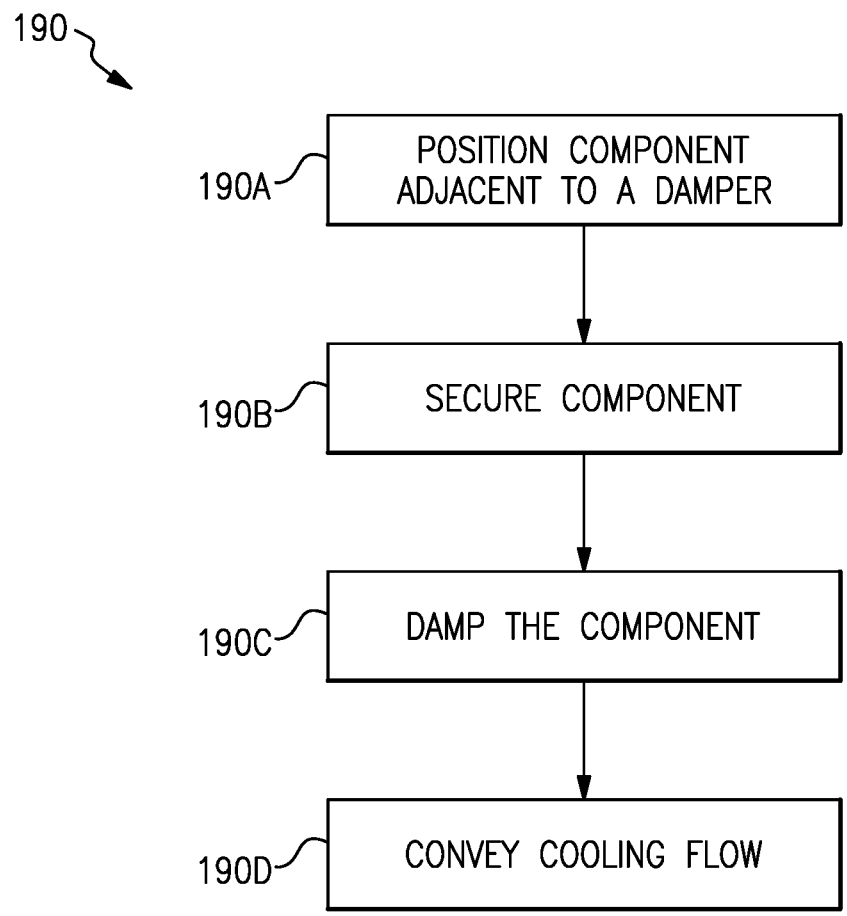
FIG. 8 illustrates a method of damping for a gas turbine engine.

FIG. 8 illustrates an exemplary method of damping for a gas turbine engine in a flow chart 190. The method 190 can be utilized to dampen various gas turbine engine components, including any of the components and associated assemblies disclosed herein, such as the component 160. Reference is made to the component 160 and assembly 168 for illustrative purposes.

At step 190A, the component 160 is positioned adjacent to the damper 170 to establish the cold assembly state, as illustrated in FIG. 5. At step 190B, the component 160 can be secured to a portion of the gas turbine engine. Step 190B can include securing the component 160 to the static structure 136 at one or more mounting points 180, including the first and second mounting points 180-1, 180-2. Step 190B can occur such that the component 160 is suspended between the mounting points 180-1, 180-2.

At step 190C, in operation the damper 170 provides an amount of damping to the component 160 during the hot assembly state. The damper 170 can provide the amount of damping to the component 160 during the hot assembly state in response to contact between the component contact surface 172C and damper contact surface 174C along the interface 175. The contact may occur due to relative movement between the component 160 and damper 170, which may be caused by mechanical loading and/or thermal growth of the component 160, damper 170 and/or other portions of the engine.

Figure 13:
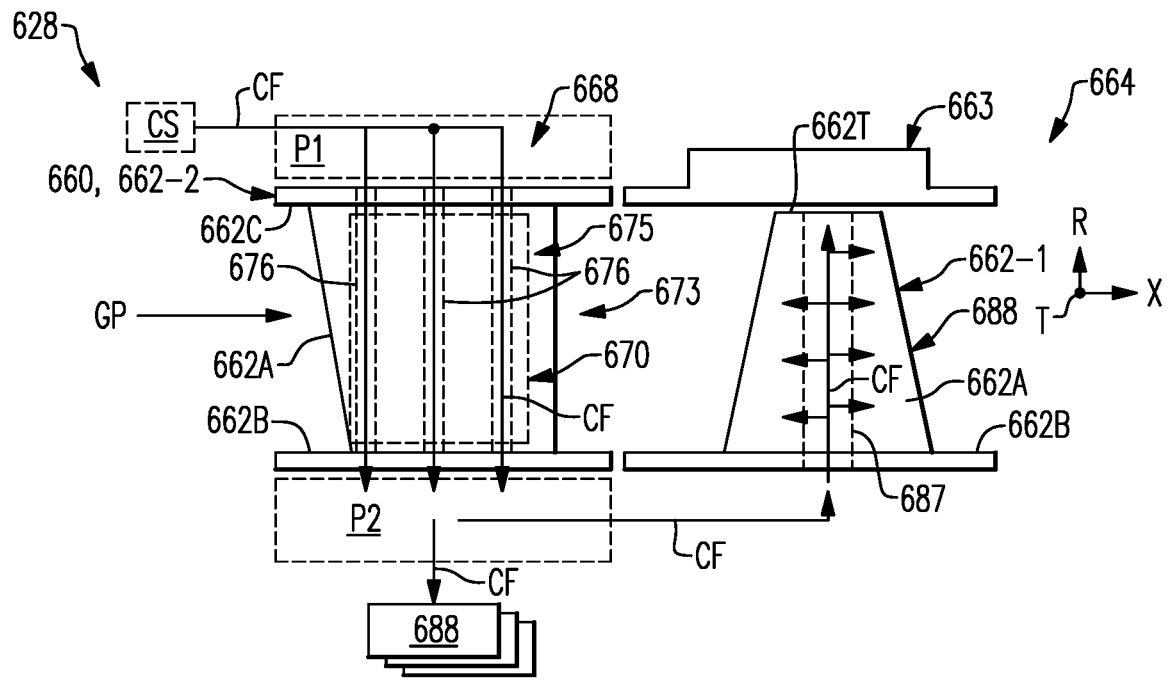
FIG. 13 illustrates a cooling arrangement for a section of a gas turbine engine.

At step 190D, cooling flow can be conveyed to provide cooling augmentation to the component 160 and/or damper 170. Step 190D can include conveying cooling flow through the cooling passages 176, cooling paths 177 and/or cooling paths 185 to provide cooling augmentation to adjacent portions of the component 160 and portions of the damper 170 in contact with the component 160 along the interface 175. Step 190D can include conveying cooling flow through cooling paths 177 established between the contact points CP along the interface 175. Step 190D can include conveying the cooling flow from the cooling passages 176, cooling paths 177 and/or cooling paths 185 to one or more downstream components to provide secondary cooling augmentation, including any of components disclosed herein such as the components 688, 788 of FIGS. 13-14.

Figure 9:
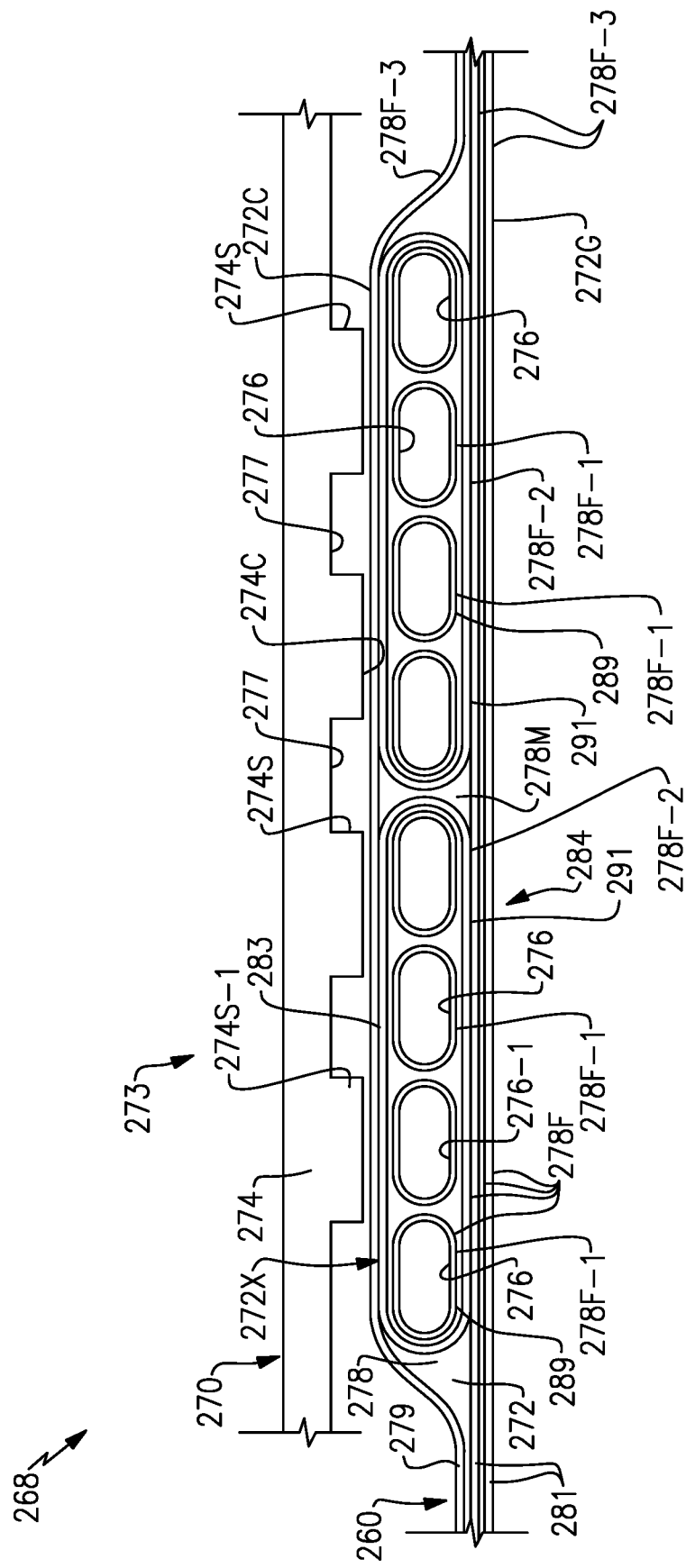
FIG. 9 illustrates a sectional view of another assembly including a component and damper.

FIG. 9 illustrates another exemplary assembly 268 including a gas turbine engine component 260 and an adjacent damper 270. In the implementation of FIG. 9, the component 260 is established by a composite construct 278 having fibers 278F in a matrix material 278M. The component 260 can include a core 272X established by the composite construct 278. Sets of fibers 278F-1 can be arranged in two-dimensional weaves in a through-thickness direction and that establish plies 289 looping about one or more cooling passages 276. The composite construct 278 can include fibers 278F-2 establishing one or more overwraps 283. The fibers 278F-2 can be arranged in plies 291 to establish the respective overwraps 283. The plies 289, 291 are arranged to establish the core 272X.

The fiber construction of the plies 289, 291 can be the same or can differ, and can be formed according to any of the fiber constructions disclosed herein. In implementations, the plies 289 including fibers arranged in a two-dimensional network, and the plies 291 are arranged in a three-dimensional fiber network. In other examples, the plies 291 are arranged in a two-dimensional fiber network, which can be the same or differ from the two-dimensional fiber network of the plies 289. Each overwrap 283 can be dimensioned to encircle one or more of the sets of fibers 278F-1 of the two-dimensional weave establishing the respective cooling passages 276. Set of plies 279, 281 can be arranged to extend along each overwrap 283 on opposite sides of the core 272X. Fibers 278F-3 can be arranged to establish the plies 279, 281.

FIG. 10 illustrates another exemplary assembly 368 including a gas turbine engine component 360 adjacent to a damper 370. The damper 370 includes a damper body 374 establishing one or more damper contact surfaces 374C. The damper body 374 can be formed from corrugated sheet metal having one or more undulations that establish respective standoffs 374S distributed along a length and/or width of the damper body 374. The standoffs 374S can be dimensioned to establish respective contact points CP of the contact surface 374C with an opposing contact surface 372C of the component 360 along the interface 375.

Various techniques can be utilized to secure the component 360, including any of the techniques disclosed herein. The component 360 can include a set of hooks 361H extending outwardly from a main body 372 of the component 360. The hooks 361H can be dimensioned to engage respective hooks 337H of the engine case 337 or another portion of the static structure 336 at respective mounting points 380-1, 380-2. In other implementations, the component 360 has a dovetail interface at the mounting points 380-1, 380-2. The component 360 can be slid or otherwise moved in a circumferential direction T between the hooks 337H to mount the component 360. The component 360 can be suspended between the mounting points 380-1, 380-2. The damper 370 can be secured to the engine case 337 and static structure 336 utilizing various techniques, such as one or more fasteners F.

FIG. 11 illustrates yet another exemplary assembly 468 including a gas turbine engine component 460 adjacent to a damper 470. The damper 470 has a damper body 474 having a generally U-shaped, convex geometry. The damper body 474 includes a damper contact surface 474C dimensioned to contact or abut an opposing component contact surface 472C of the component 460. Standoffs can be omitted such that the damper body 474 has a substantially planar geometry along the damper contact surface 474C establishing the interface 475.

Figure 12:
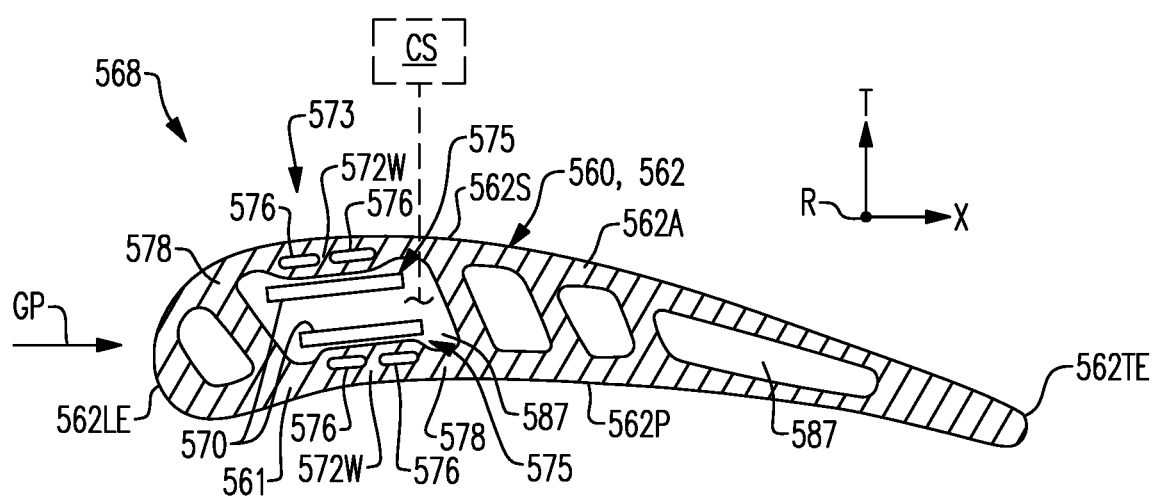
FIG. 12 illustrates a sectional view of an airfoil including dampers.

FIG. 12 discloses an exemplary arrangement 568 including a gas turbine component 560 and one or more dampers 570. In the illustrated example of FIG. 12, the component 560 is an airfoil 562 including an airfoil section 562A establishing a cooling scheme 573 dimensioned to convey cooling flow from a coolant source CS to provide cooling augmentation to adjacent portions of the airfoil 562. The component 560 can be formed utilizing any of the techniques and materials disclosed herein. The component 560 can be established by a composite construct 578 utilizing any of the fiber constructions disclosed herein. The composite construct 578 can establish one or more cooling passages 576 in respective walls 561 of the component 560, including the pressure and/or suction sides 562P, 562S of the airfoil 562. The cooling passages 576 can be spaced apart by respective walls 572W. One or more dampers 570 can be positioned in a respective internal cavity 587 established in the component 560. The internal cavity 587 can be dimensioned to convey cooling flow from the coolant source CS to provide cooling augmentation to adjacent portions of the component 560. The cooling passages 576 can be fluidly isolated from each other and/or the internal cavity 587. In other implementations, the internal cavity 587 conveys cooling flow to the cooling passages 576 in operation.

The disclosed assemblies can be utilized to provide secondary cooling augmentation to other components and portions of the engine, including any of the components disclosed herein. In the illustrative example of FIG. 13, the assembly 668 is incorporated into a turbine section 628. The assembly 668 includes a gas turbine engine component 660 and at least one damper 670 (shown in dashed lines for illustrative purposes). The damper 670 can be positioned in an internal cavity of the component 660, as illustrated by the damper 570 of FIG. 12. The component 660 and damper 670 can be include be fabricated according to, and can include any of the materials, disclosed herein including. In implementations, the component 660 is formed from a CMC, PMC or other composite material, and the damper 670 is formed from a metallic material.

The assembly 668 establishes a cooling scheme 673 incorporated into a cooling arrangement 664. The component 660 can include one or more cooling passages 676 dimensioned to convey cooling flow CF from a cooling source CS directly or via a cooling cavity or plenum P1 to cool adjacent portions of the component 660 and/or damper 670, including an interface 675 established therebetween. The component 660 can be arranged to convey the cooling flow CF to a downstream portion of the turbine section 628 and/or another portion of the engine to provide secondary cooling augmentation, which can occur subsequent to cooling portions of the component 660 and damper 670 adjacent to the interface 675. In implementations, the cooling flow CF is communicated from the cooling passages 676 to a cooling cavity or plenum P2. The cooling flow CF can be conveyed from the plenum P2 to one or more other gas turbine engine components 688, such as an adjacent blade 662-1. The components 688 can include a tangential on-board injector (TOBI) or radial on-board injector (ROBI) that convey the cooling flow CF to a downstream component.

Figure 14:
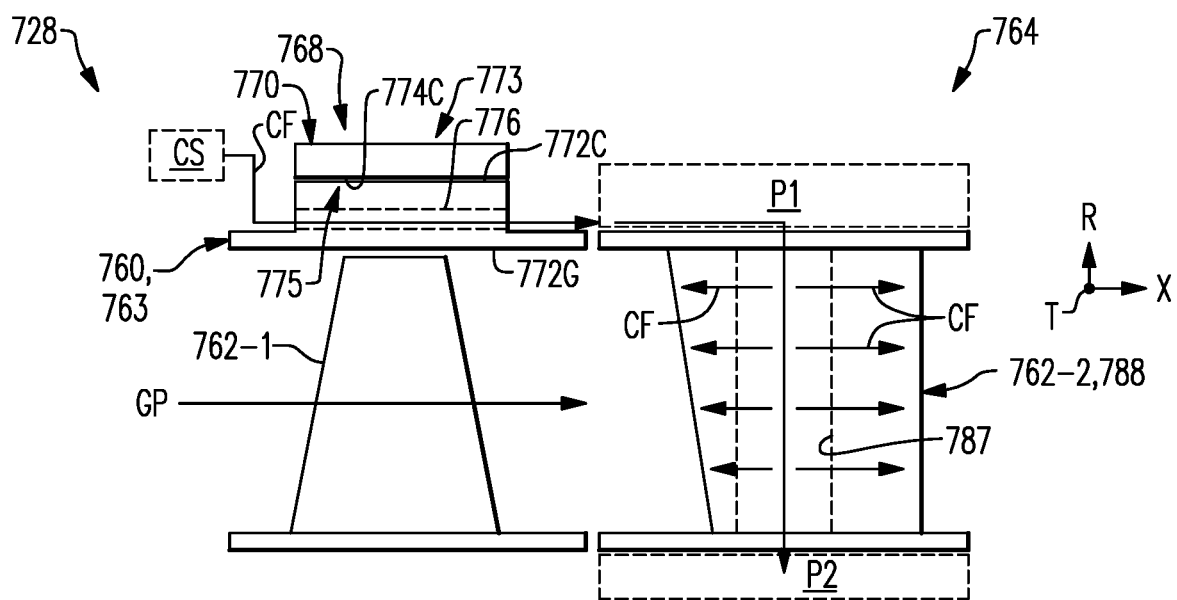
FIG. 14 illustrates another cooling arrangement for a section of a gas turbine engine.

In the illustrative example of FIG. 14, the assembly 768 is incorporated into a turbine section 728. The assembly 768 includes a gas turbine engine component 760 and at least one damper 770 adjacent to the component 760. In the illustrated example of FIG. 14, the component 760 is a BOAS 763. The assembly 768 establishes a cooling scheme 773 incorporated into a cooling arrangement 764. The component 760 can include one or more cooling passages 776 dimensioned to convey cooling flow CF from a cooling source CS to provide cooling augmentation to portions of the component 760 and damper 770 adjacent to an interface 775. The cooling passages 776 can be dimensioned to convey the cooling flow CF to a downstream portion of the turbine section 728, such as a cavity or plenum P1. The cooling flow CF can be conveyed from the plenum P1 or directly to another component 788 such as a vane 762-2. The vane 762-2 can include an internal cavity 787 dimensioned to receive the cooling flow CF. The cooling flow CF can be conveyed from the internal cavity 787 to cool portions of the component 788 and/or can be conveyed to another cavity or plenum P2.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for a gas turbine engine comprising:
at least one metallic damper including a first contact surface; and
a gas turbine engine component comprising:
a main body extending in a first direction between a gaspath surface and a second contact surface;
wherein the first and second contact surfaces oppose each other along an interface extending in a second direction, the first and second contact surfaces are dimensioned to contact each other along the interface in a hot assembly state, and the first and second contact surfaces are spaced apart along the interface in a cold assembly state; and
wherein the main body is established by a composite including fibers in a matrix material, and at least some of the fibers are arranged to establish a plurality of cooling passages aligned with the interface relative to the second direction.

2. The assembly as recited in claim 1, wherein the at least one damper includes a damper body having a plurality of standoffs dimensioned to establish a set of discrete contact points along the interface in the hot assembly state.

3. The assembly as recited in claim 2, wherein the plurality of cooling passages are a first set of cooling passages, the at least one damper includes a plurality of recesses interspersed with the standoffs, the recesses establish a second set of cooling passages along the interface bounded by the second contact surface of the gas turbine engine component, the second set of cooling passages are aligned with respective cooling passages of the first set of cooling passages, and the main body of the gas turbine engine component includes a third set of cooling passages aligned with the respective standoffs.

4. The assembly as recited in claim 1, wherein the fibers include sets of fibers arranged in two-dimensional weaves about the respective cooling passages.

5. The assembly as recited in claim 4, wherein the fibers are arranged to establish an overwrap that encircles the sets of fibers and the cooling passages.

6. The assembly as recited in claim 1, wherein the fibers are arranged to establish a three-dimensional weave, and the three-dimensional weave includes segments of fiber that alternate on opposite sides of the cooling passages and crisscross to establish one or more internal walls of the main body between the cooling passages.

7. The assembly as recited in claim 6, wherein the segments of fiber are arranged such that the respective fiber loops about each one of the cooling passages.

8. The assembly as recited in claim 1, wherein:
the main body includes a core established by the fibers, the core comprising the cooling passages;
the main body includes a first mounting point and a second mounting point on opposite sides of the core relative to the second direction;
the main body includes a first ply and a second ply extending along opposite sides of the core relative to the first direction to establish the gas path surface and the second contact surface, and the first and second plies are joined together at a first bifurcation and a second bifurcation adjacent to the respective first and second mounting points.

9. The assembly as recited in claim 8, wherein the gas turbine engine component is dimensioned to be suspended between the first and second mounting points in an installed position.

10. The assembly as recited in claim 8, wherein:
the at least one damper includes a damper body having a plurality of standoffs, and the plurality of standoffs are dimensioned to establish a set of discrete contact points along the interface in the hot assembly state; and
the gas turbine engine component and the at least one damper cooperate to establish a plurality of cooling paths along the interface between the set of discrete contact points.

11. The assembly as recited in claim 1, wherein the gas turbine engine component is a turbine component.

12. The assembly as recited in claim 1, wherein the at least one damper includes a first damper and a second damper opposed to, but spaced apart from, the first damper.

13. A gas turbine engine comprising:
an array of blades rotatable about an engine axis;
an array of vanes adjacent to the array of blades;
an array of blade outer air seals distributed about the array of blades to bound a gas path; and
wherein at least one of the blades, the vanes and the blade outer air seals comprises:
at least one metallic damper including a first contact surface;
a wall including a main body extending between a gaspath surface and a second contact surface, the first and second contact surfaces dimensioned to contact each other along an interface during engine operation, and the first and second contact surfaces are spaced apart along the interface in a cold assembly state; and
wherein the main body is established by a composite including fibers in a matrix material, and at least some of the fibers are arranged to establish a plurality of cooling passages adjacent to the interface.

14. The gas turbine engine as recited in claim 13, wherein the wall is suspended between first and second mounting points secured to an engine static structure, and the first and second mounting points are spaced apart from and on opposite sides of the interface.

15. The gas turbine engine as recited in claim 14, wherein:
the wall extends in an axial direction between a leading edge portion and a trailing edge portion, extends in a circumferential direction between first and second mate faces and extends in a radial direction between the second contact surface and the gas path surface relative to the engine axis; and
one of the first and second contact surfaces faces radially outwardly with respect to the radial direction, and another one of the first and second contact surfaces faces radially outwardly with respect to the radial direction.

16. The gas turbine engine as recited in claim 14, wherein:
the at least one damper includes a damper body having a plurality of standoffs dimensioned to establish a set of discrete contact points along the interface during engine operation; and
the gas turbine engine component and the at least one damper cooperate to establish a plurality of cooling paths along the interface between the set of discrete contact points.

17. The gas turbine engine as recited in claim 13, wherein the fibers are arranged to establish a three-dimensional weave, and the three-dimensional weave includes segments of fiber arranged along respective periodic paths that alternate on opposite sides of the cooling passages and crisscross to establish one or more internal walls of the main body between the cooling passages.

18. A method of damping for a gas turbine engine comprising:
positioning a gas turbine engine component adjacent to at least one metallic damper, wherein:
the at least one damper includes a first contact surface; and
the gas turbine engine component includes a main body extending between a gaspath surface and a second contact surface, the first and second contact surfaces are spaced apart along the interface in a cold assembly state, and the main body is established by a composite including fibers arranged to establish a plurality of cooling passages aligned with the interface;
damping the gas turbine engine component in response to contact between the first and second contact surfaces along the interface; and
conveying cooling flow through the cooling passages to provide cooling augmentation to a portion of the at least one damper in contact with the gas turbine engine component along the interface.

19. The method as recited in claim 18, further comprising:
securing the gas turbine engine component to a static structure at first and second mounting points; and
wherein the first and second mounting points are spaced apart from and on opposite sides of the interface such that the gas turbine engine component is suspended between the first and second mounting points.

20. The method as recited in claim 18, wherein the fibers are arranged to establish a three-dimensional weave, and the three-dimensional weave includes segments of fiber that alternate on opposite sides of the cooling passages and crisscross to establish one or more internal walls of the main body between the cooling passages.

21. The method as recited in claim 18, further comprising:
conveying cooling flow through a plurality of cooling paths established between a set of discrete contact points along the interface.

* * * * *